(12) United States Patent
Harada et al.

(10) Patent No.: US 6,501,617 B1
(45) Date of Patent: Dec. 31, 2002

(54) PRESS-FIT AND PLASTIC-FLOW COUPLING OF A SHAFT TO A HUB OF A DISK DEVICE

(75) Inventors: Kouji Harada, Hitachinaka (JP); Kazuhiko Kawakami, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 67 days.

(21) Appl. No.: 09/631,625

(22) Filed: Aug. 4, 2000

(30) Foreign Application Priority Data

Aug. 6, 1999 (JP) ............................................. 11-223423

(51) Int. Cl.$^7$ ................................................ G11B 17/02
(52) U.S. Cl. ................................... 360/99.08; 360/99.12
(58) Field of Search .......................... 360/97.01–97.02, 360/98.08, 99.12, 99.07, 99.08

(56) References Cited

U.S. PATENT DOCUMENTS 3,641,865 A     2/1972  Swindt et al.
3,930,362 A  *  1/1976  Cielaszyk ................... 58/85.5
4,377,762 A     3/1983  Tatsumi et al.
4,996,613 A     2/1991  Hishida

FOREIGN PATENT DOCUMENTS

JP     11-120743    4/1999
JP     11-122867    4/1999

* cited by examiner

Primary Examiner—A. J. Heinz
(74) Attorney, Agent, or Firm—McDermott, Will & Emery

(57) ABSTRACT

A outer circumferential part of a body to be coupled having an annular groove formed 31 in the outer periphery of a shaft 1 is press-fitted into the inner circumferential part of a coupling hole in the central portion of a hub 2, the vicinity of the hole in the end of the hub is plastic-deformed over the whole periphery, and material for the hub is caused to plastic-flow so as to bury a recess of the shaft, and to apply compression stress to the shaft, whereby a coupling force between a thin hub and a small diameter shaft is obtained by shearing force and compressing force of the material for the hub.

13 Claims, 8 Drawing Sheets

PRESS-FIT AND PLASTIC-FLOW COUPLING OF A SHAFT TO A HUB OF A DISK DEVICE

BACKGROUND OF THE INVENTION

The present invention relates to a method for coupling a shaft with a hub of a spindle motor having a dynamic pressure bearing construction, which motor is a spindle motor used for a disk device, DVD, and CD-ROM of a computer or the like, particularly, a thin-type hard disk drive motor mounted on a portable personal computer such as a note-type personal computer.

Conventional methods for coupling a shaft with a hub include methods such as press-fitting, shrink fitting, and joining by way of adhesives, and welding.

However, in these conventional coupling methods, where a small diameter shaft (for example, 3 mm of outside diameter) is coupled with a thin hub (for example, 1 mm of thickness) of a dynamic pressure bearing type spindle motor of a thin type hard disk device, the respective methods had the following problems.

As is well-known, the press-fitting method has a limit in strength and particularly is weak in shock. In the shrink fitting method, since a shaft is small in diameter, a shrink fitting allowance cannot be secured, and the method has a limit in strength, similarly to the press-fitting. Further, heating is necessary, and the precision after shrink fitting is poor, so that after coupling processing is necessary. Furthermore, it takes much time for heating and cooling, resulting in poor productivity.

In the method using the adhesive, since the length of adhesion is short, the method has a limit in strength and is weak in shock. The extra adhesive forced out from the joined part adversely influences on the performance of a motor. Furthermore, setting of the adhesive requires time and heating, thus lowering the productivity.

In the welding method, the thermal deformation occurs, and particularly, the bend occurs due to the thermal shrinkage, failing to secure the accuracy. Where the material for a shaft comprises a martensite texture of high volume of carbon such as SUS440C, there was a problem such that a crack occurs in the shaft. Further, an expensive machine such as a laser welder was necessary.

As described above, in the conventional methods, it was difficult to achieve the coupling capable of securing the strength such as loose, bending, turning torque or the like necessary for stress occurring in the coupled part between a shaft and a hub by clamping a disk to the hub, and the run out accuracy relative to the surface of the disk on which the shaft and the hub are mounted, and the coupling for giving sealing properties to the coupled part.

SUMMARY OF THE INVENTION

The present invention has been accomplished in order to solve the problems noted above with respect to prior art, and provides a method for coupling a small diameter shaft with a thin hub with high strength and high accuracy, and a coupling method for giving high sealing properties to the coupled part.

For achieving the first object, according to the present invention, there is provided a method comprising: press-fitting an outer circumferential part having an annular groove formed in the outer periphery of a shaft into a coupling hole in the central portion of a hub; plastic-deforming the vicinity of the hole in the end of a hub over the whole periphery; and causing material for the hub to plastic-flow so as to burry an recess of the shaft by the plastic-deformation and to apply compression stress to the shaft; whereby the coupling force is obtained by shearing force and compressing force provided by the material used for the hub, to couple the shaft with the hub. For achieving the second object, there is provided a method comprising: press-fitting an outer circumferential part having a plurality of annular grooves formed in the outer periphery of the shaft and being provided with a crest of a cylindrical part between the grooves into a coupling hole in the central portion of the hub; plastic-deforming the vicinity of the coupling hole in the end of the hub over the whole periphery; and causing material for the hub to plastic-flow so as to burry an recess of the shaft by the plastic-deformation and to apply compression stress to the shaft; whereby the coupling force is obtained by shearing force and compressing force provided by the material used for the hub, to couple the shaft with the hub. In this case, it is essential to adopt the press-fitting for coupling force.

According to the present invention as constructed above, even in coupling between a thin hub and a small diameter shaft, the satisfactory strength and accuracy, and sealing properties are obtained, and coupling can be attained with excellent productivity by inexpensive equipment.

DETAILED DESCRIPTION OF THE INVENTION

Figure 1:
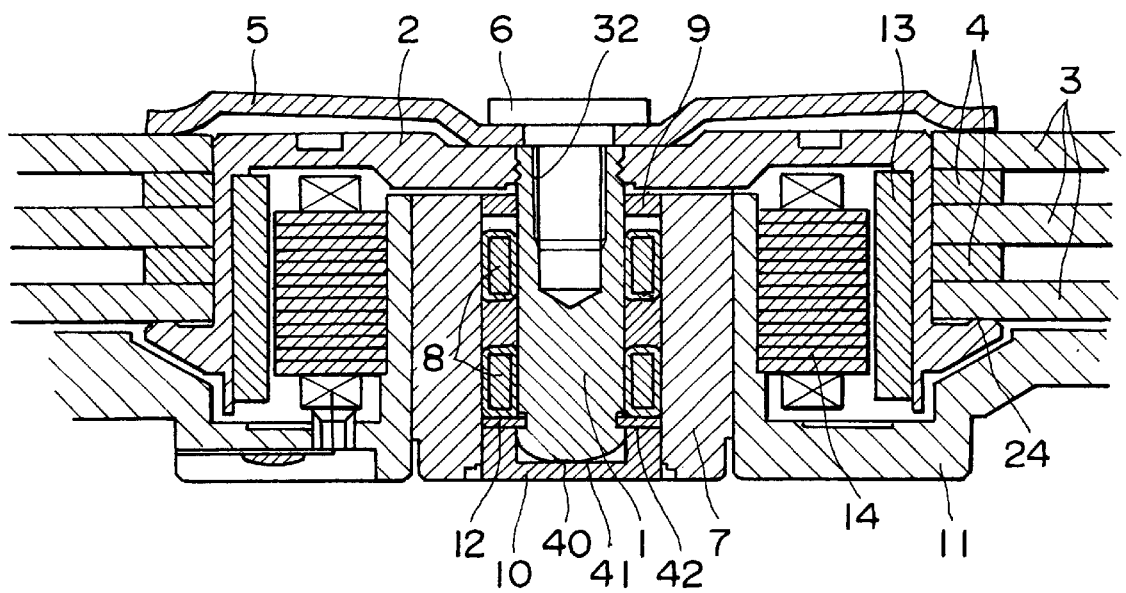
FIG. 1 is a longitudinal sectional view of a dynamic pressure bearing spindle motor of a hard disk device using a coupled body of a hub and a shaft.

FIG. 1 shows one embodiment of a dynamic pressure bearing spindle motor of a hard disk device using a coupled body of a hub and a shaft according to the present invention.

In FIG. 1, a shaft 1 is integrated with a hub 2 by a coupling method according to the present invention, and a magnet 13 is fixedly mounted on the hub 2. A plurality of disks 3 in the form of a memory medium are stacked on a flange 24 of the hub 2 with a disk spacer 4 put therebetween, and clamped by a clamp 5 fastened to an internal thread 32 of the shaft 1 by means of a screw 6. The shaft 1 is fitted rotatably into an inner circumferential part of a dynamic bearing metal 8 secured to a housing 7 to constitute a radial dynamic pressure bearing due to the dynamic pressure effect produced by a magnetic fluid filled within the housing 7 by rotation. The housing 7 is fixedly mounted on a base 11. A thrust receiving plate 10 is joined to the housing 7 with a stopper ring 12 put between the plate 10 and the dynamic pressure bearing metal 8, and a spherical end 40 of the shaft 1 is supported by a thrust receiving surface 41 to constitute a thrust bearing. The shaft 1 is restricted in floating-up in the thrust direction by the stopper ring 12 fitted in a stopper groove 42. A wound stator core 14 is fixedly mounted on the base 11 by means of an adhesive, and when energized, the magnet 13 receives the rotating force to rotate the hub 2.

The hub 2 and the shaft 1 will be explained hereinafter. The material for the hub 2 which is a coupled body is, preferably, easily subjected to plastic-deformation, and smaller in deformation resistance than the shaft 1 which is a body to be coupled, which comprises ferrite stainless steel, for example, SUS430, in consideration of corrosion resistance and magnetic characteristic as a motor. The shaft 1 is formed of martensite stainless steel, for example, SUS440C excellent in abrasion resistance and corrosion resistance in consideration of the bearing performance and is processed by hardening. The outer circumferential part to be coupled is provided with an annular groove 31. The detail of the groove shape will be described later.

Figure 2:
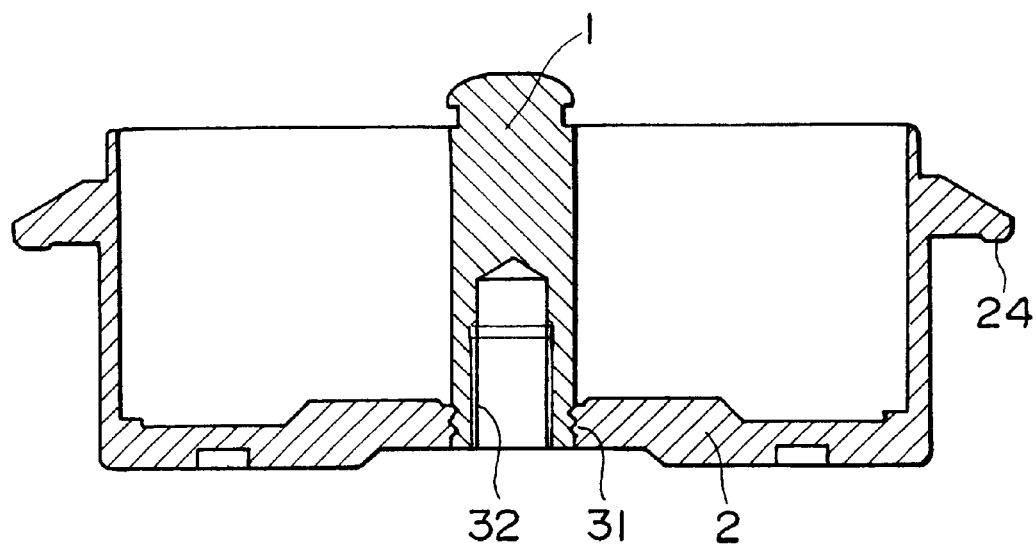
FIG. 2 is a longitudinal sectional view of a coupled body of a hub and a shaft.

FIG. 2 shows one embodiment of a coupled body of a hub and a shaft according to the present invention.

The shaft 1 is formed with the whole peripheral groove 1 in the outer circumference thereof, and plastic-coupled with a coupling hole 21 of the hub smaller in diameter than the outside diameter of the shaft 1 by the method as shown below.

Figure 3:
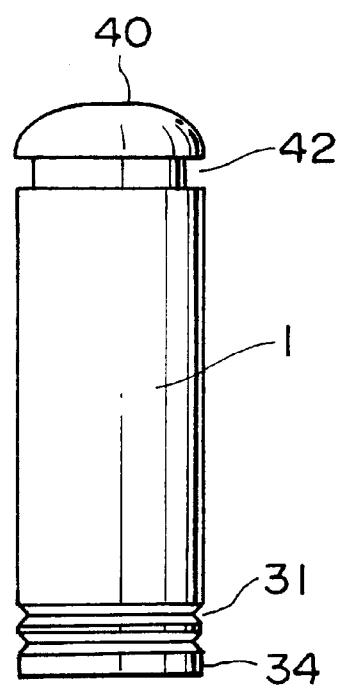
FIG. 3 is an external view of a shaft.
Figure 4:
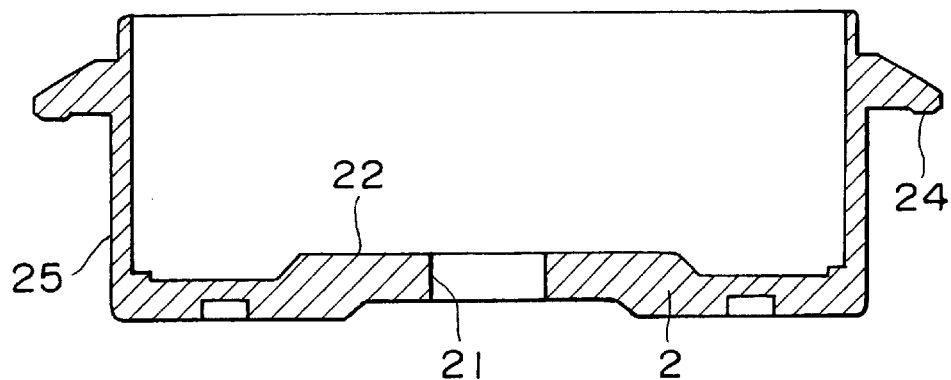
FIG. 4 is a longitudinal sectional view of a hub.

The coupling method comprises a first step of press-fitting the shaft 1 shown in FIG. 3 into the hub 2 shown in FIG. 4, and a second step of plastic coupling.

Figure 5:
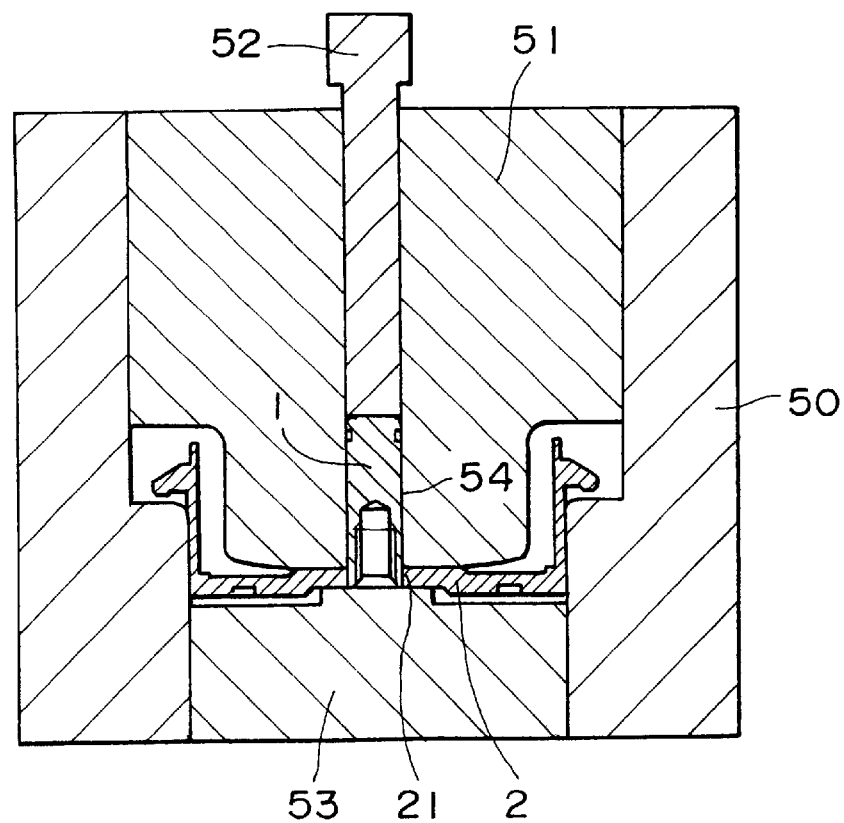
FIG. 5 is a longitudinal sectional view of a mold in the press-fitting step.

First, the first step will be described. As shown in FIG. 5, the hub 2 is held by a ring 50 and a piece 53, the shaft 1 is inserted into a hole 54 of a guide 51, and the outer circumferential part 34 of the shaft 1 guided to the hole 54 by a pin 52 is press-fitted into the coupling hole 21 of the hub 2 by a press ram not shown with a load in excess of the pressing resistance. At this time, preferably, a clearance between fitted parts is set to a fine clearance not more than 0.005 mm so that the shaft 1 and the hub 2 are not inclined relatively, in terms of obtaining the pressing accuracy. In the present embodiment, the outside diameter of the shaft and the inside diameter of the coupling hole of the hub are set to 3.000 mm and 2.992 mm, respectively. The larger the pressing allowance, the higher the strength, but scoring tends to occur, and the pressing accuracy lowers accordingly.

Figure 6:
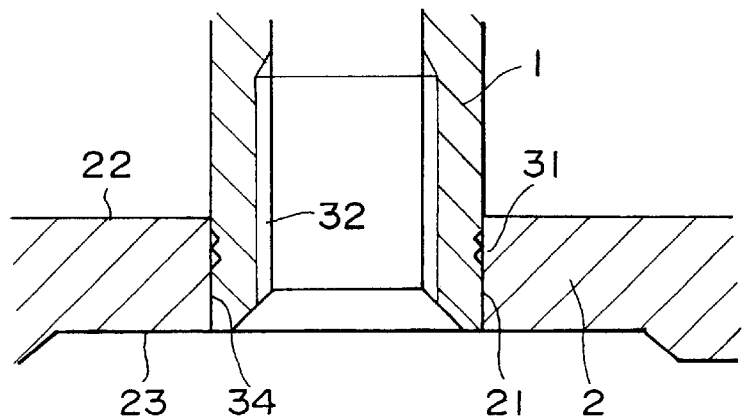
FIG. 6 is an enlarged longitudinal sectional view of a coupled part of a shaft and a hub after completion of the press-fitting.

FIG. 6 is an enlarged longitudinal sectional view of a coupled part after completion of the press-fitting.

Figure 7:
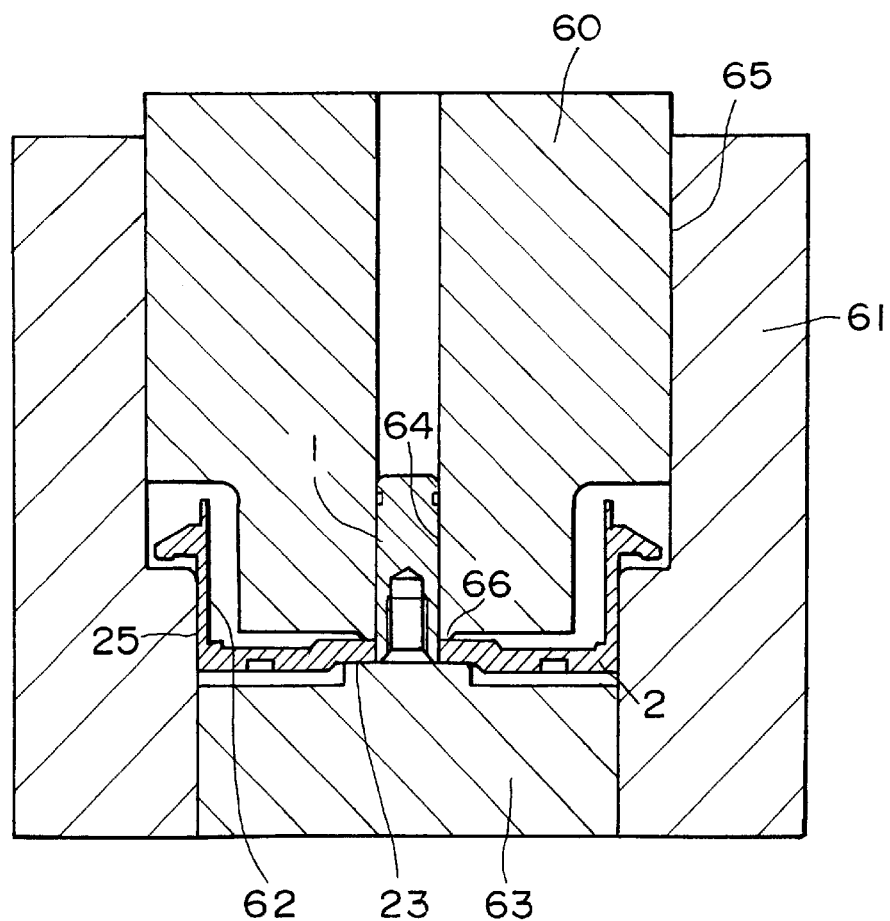
FIG. 7 is a longitudinal sectional view of a mold in the plastic coupling step.

The second step of plastic coupling will be described hereinafter. As shown in FIG. 7, a bottom surface 23 of a press-fitted body of the shaft 1 and the hub 2 press fitted in the first step is held by a piece 63, the outer circumferential part 25 is held by an inner circumferential part 62 of a guide ring 61, and the shaft 1 is held by a guide hole 64 of a punch 60 guided to an inner circumferential part 65 of the guide ring 61. A ring-like projection 66 provided at the extreme end of the punch 60 presses as vertically as possible, by means of a press ram not shown, the vicinity of the coupling hole 21 of the end 22 of the hub 2 with the load in which the material for the hub produces stress enough to effect plastic-deformation to allow the material in the vicinity of the coupling hole 21 to plastic-flow along the whole peripheral groove 31 for coupling.

Figure 8:
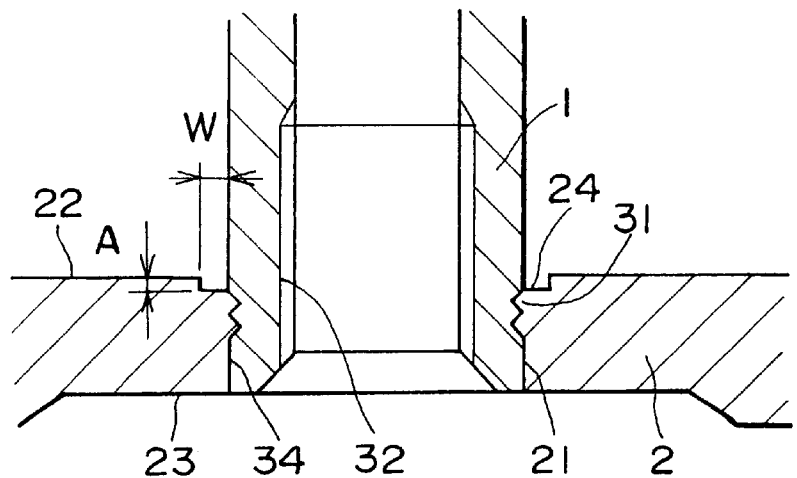
FIG. 8 is an enlarged longitudinal sectional view of a coupled part of a shaft and a hub after completion of the plastic coupling.

FIG. 8 is an enlarged longitudinal sectional view of a coupled part after completion of the plastic coupling.

In order to obtain the high coupling accuracy, it is better that a clearance between the guide hole 64 and the outer circumferential part of the shaft 1 be smaller. Further, when the projecting width W of the projection 66 of the punch 60 and the pressing depth H are excessively large, the load for the plastic-deformation increases, and the material in excess of that flowing within the groove is caused to flow, thus deteriorating the coupling accuracy. Therefore, they are set in accordance with the groove shape.

While a description has been made of a method for carrying out the first step of press-fitting and the second step of plastic coupling using separate molds, it is noted that the step can be shortened by carrying out the press-fitting and the plastic coupling using a single mold.

The groove shape of the shaft will be mentioned below.

Figure 9:
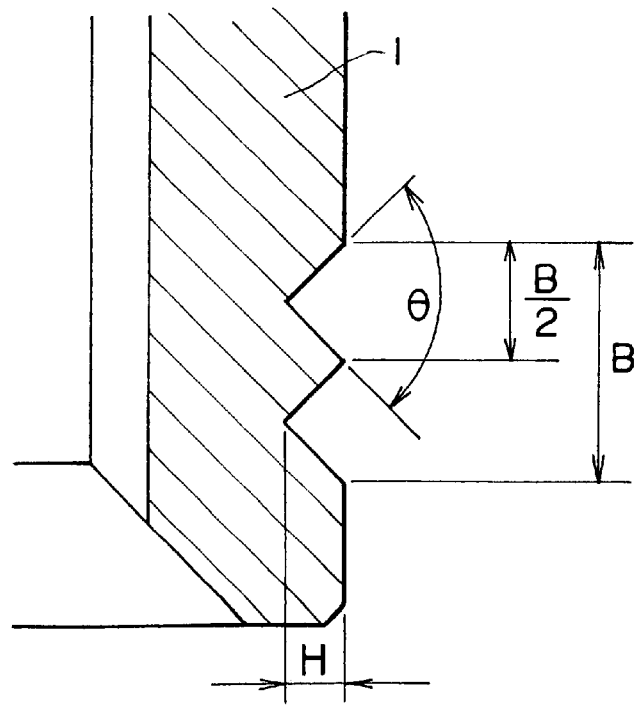
FIG. 9 is an enlarged longitudinal sectional view of a groove part of a shaft.

FIG. 9 is an enlarged longitudinal sectional view showing one example of a groove part.

Elements for deciding a sectional shape of a groove include the groove depth H, the groove width B, the groove angle $\theta$, the groove number n and the like.

First, if the groove depth H is excessively shallow, when an external force exerts in an axial direction, plastic-deformation tends to occur, failing to obtain the sufficient shearing strength. If it is excessively deep, the inflow of material into the groove is insufficient to form a cavity, thus lowering the strength. The shaft 1 is provided with internal threads 32, and the wall-thickness in the vicinity of the coupling part is thin. Accordingly, when the groove depth is deep, the strength of the shaft lowers, and therefore, approximately 0.07 to 0.13 mm is preferable.

Next, the groove width B may be changed according to the shearing strength required, but if the width is excessively large, the distance from the extreme end of the punch to the lower part of the groove is extended during the coupling, making the flowing friction loss of material to flow into the groove great. As a result, even if a great load is applied by the punch, the internal stress of material in the vicinity of the lower part of the groove does not reach a level enough to make plastic-deformation. Accordingly, the amount of plastic-deformation is so small that the inflow of material into the groove is not sufficient. The wall-thickness of the hub in the coupled part is so small that the groove width naturally has a limit, preferably, approximately B/2=0.15 to 0.25.

With respect to the groove angle $\theta$, when the angle $\theta$ is small, the material is hard to flow within the groove, while when it is large, the draft strength is weak. Thus, preferably, the angle $\theta$ is from 60° to 120°.

With respect to the number n of grooves, when the number n is 2 (n=2), the strength is highest. Comparing the number n=1 with n=2 when the groove width B is the same, the case of n=2 is high in strength since the contact area between the shaft and the hub is large. However, even if the number of grooves is large, the inflow of material into the groove is worsened, thus lowering the strength.

Figure 10:
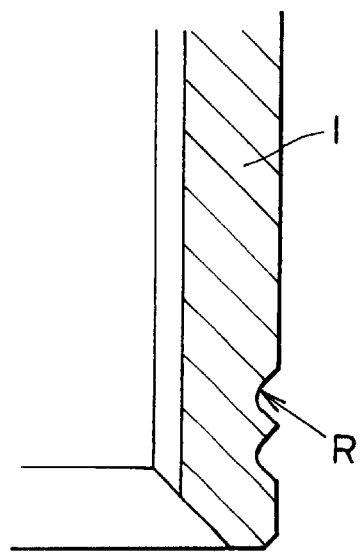
FIG. 10 is an enlarged longitudinal sectional view of an R-shaped groove part of a shaft.
Figure 11:
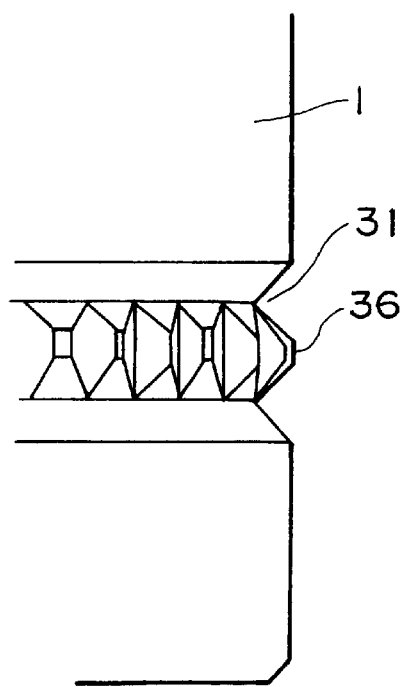
FIG. 11 is an enlarged view of a groove part with a knurled portion of a shaft.

The sectional shape of the groove need not be a triangle, but an R-shape as shown in FIG. 10 may be employed. Where the high torque strength is necessary in the coupled part, a knurled portion 36 may be provided in the crest between grooves as shown in FIG. 11.

When the groove is present over the whole periphery, the material evenly plastic-flows, and the compressing force also exerts on the whole periphery evenly, thus enhancing the perpendicular accuracy as well as the strength. Further, since the groove can be processed by a lathe, the productivity is high.

Preferably, the position of the groove is set as close as possible to the pressing surface 24. If the position is away therefrom, the flowing friction resistance is so high that the material is hard to enter the groove.

Figure 12:
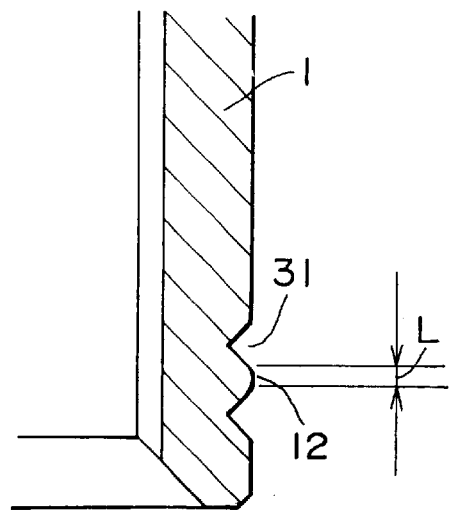
FIG. 12 is an enlarged longitudinal sectional view of a groove part having a cylindrical part between grooves of a shaft.

FIG. 12 shows an embodiment of a shaft groove for achieving the second object of the present invention. A cylindrical part 12, which a part of the outer circumferential part of a shaft, is provided between two grooves 31 to greatly generate the compressing force caused by the plastic-deformation also in the cylindrical part 12, whereby the high sealing properties can be imparted to the coupled part. Thereby, where the shock is applied to the spindle motor in FIG. 1, it is possible to prevent the magnetic fluid flowing from the clearance between the seal ring 9 and the shaft 1 from leaking from the coupled part of the hub 2 and the shaft 1 toward the disk, and it is not necessary to apply the adhesive or the like after being coupled for the purpose of preventing the leakage. When the length L of the cylindrical part 12 is too long, the plastic-flow to the second groove is interfered and the strength is lowered, and therefore, for the length L L=0.01 to 0.05 mm or so is preferable.

Figure 13:
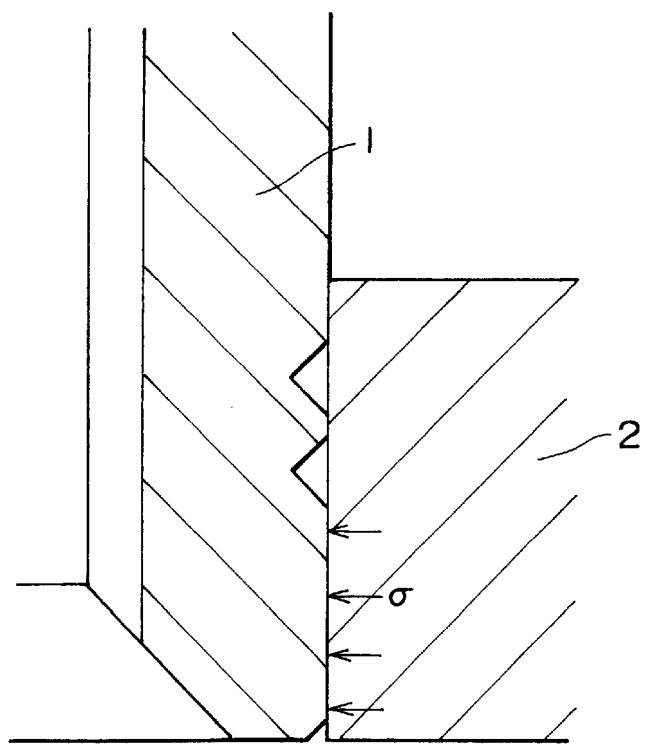
FIG. 13 is an enlarged longitudinal sectional view of a coupled part of a shaft and a hub showing stress after completion of the press-fitting.
Figure 14:
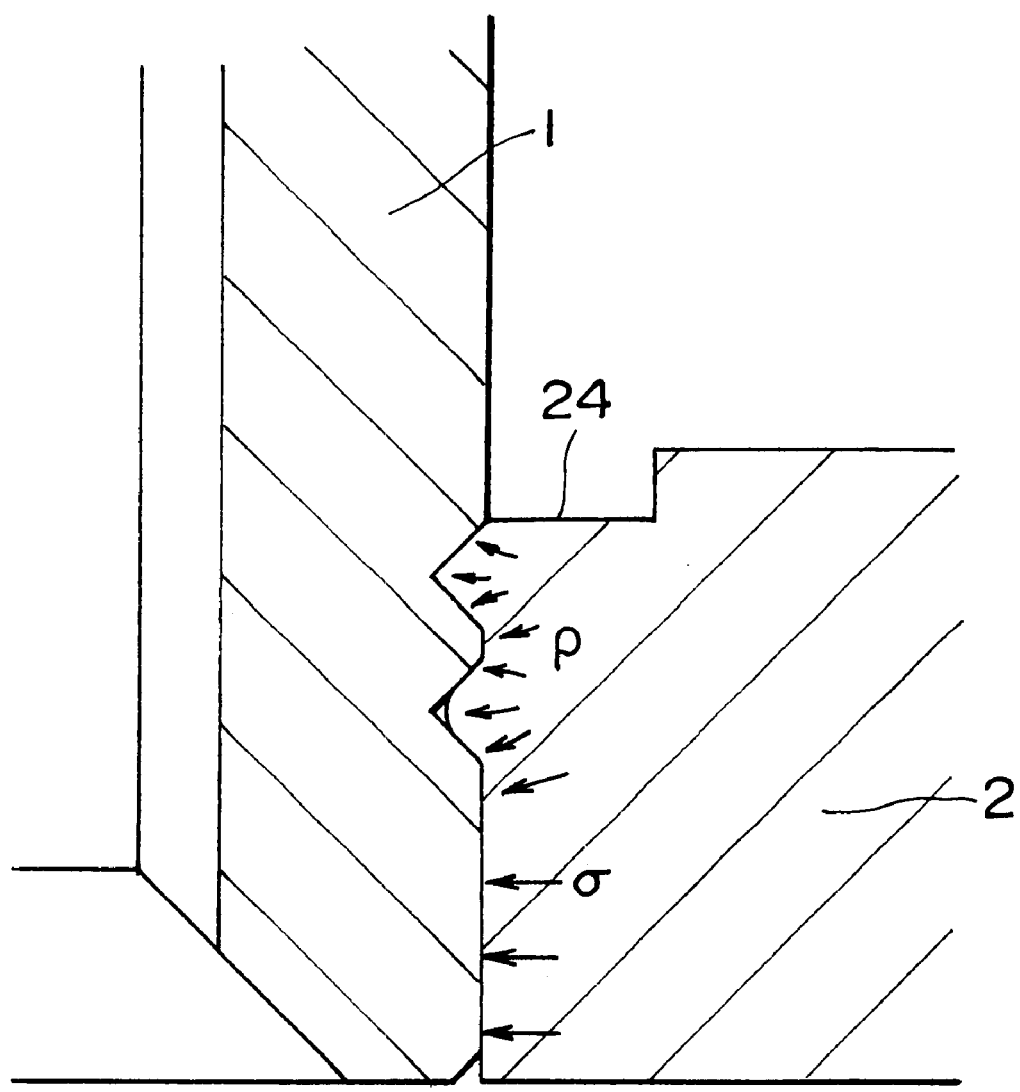
FIG. 14 is an enlarged longitudinal sectional view of a coupled part of a shaft and a hub showing stress after completion of the plastic coupling.

According to the present embodiment constructed as described above, in the state that as shown in FIG. 13, the outer circumferential part of the shaft having an annular formed groove in the outer periphery is press-fitted in the coupling hole in the central portion of the hub, there is no clearance between the shaft and the coupling hole of the hub, and stress a caused by press-fitting is exerting, the vicinity of the hole in the end of the hub is plastic-deformed over the whole periphery and the material for the hub plastic-flows so as to burry the groove part of the shaft and apply the compression stress to the shaft, whereby as shown in FIG. 14, since the shearing force and the tension force P provided by the material for the hub exert on the coupled portion, and the stress a caused by press-fitting exerts on a portion on which and the compressing force is away from the pressing part and is hard to exert, the strength of coupling the hub with the shaft is high. Further, the sealing properties can be obtained.

According to the present invention, even in the coupling of the thin hub with the small diameter shaft, the sufficient strength and accuracy can be obtained, and further the sealing properties can be obtained. Moreover, the productivity is high while inexpensive equipment is used, and the manufacturing cost can be reduced.

What is claimed is:

1. A coupling method, for a shaft and a hub of a disk device in which a hub having one or more attached disks and a shaft are integrally rotated, comprising:
   press-fitting a part of the shaft, having a recess formed in an outer periphery of the part of the shaft, into a coupling hole in a central portion of the hub;
   plastic-deforming a region of the hub around the coupling hole over the outer periphery of the part of the shaft; and
   causing material of the region of the hub to plastic-flow into and substantially fill the recess by said plastic-deformation and to apply compression to the shaft;
   whereby a coupling force comprises shearing force and compressing force.

2. The coupling method for a shaft and a hub of a disk device according to claim 1, wherein the recess comprises an annular groove.

3. The coupling method for a shaft and a hub of a disk device according to claim 2, wherein there is provided an annular crest having a knurled portion within the groove.

4. The coupling method for a shaft and a hub of a disk device according to claim 1, wherein before the press-fitting step, the method further comprises forming the coupling hole and the part of the shaft such that an inner diameter of the coupling hole is smaller than an outer diameter of the outer periphery of the part of the shaft.

5. A coupled body of a shaft and a hub of a disk device in which a hub having one or more attached disks and a shaft are integrally rotated, characterized in that:
   a part of the shaft, having a recess formed in an outer periphery of the part of the shaft, is press-fitted into a coupling hole in a central portion of the hub;
   a region of the central portion of the hub about the coupling hole is plastic-deformed over the outer periphery of the part of the shaft; and
   material of the hub plastic-flows into and substantially fills the recess by said plastic-deformation.

6. The coupled shaft and hub of claim 5, wherein the recess comprises an annular groove in the outer periphery of the part of the shaft.

7. The coupled shaft and hub of claim 6, wherein the annular groove comprises an annular knurled crest.

8. The coupled shaft and hub of claim 5, wherein:
   the recess comprises a pair of annular grooves in the outer periphery of the part of the shaft; and
   the plastic-flow of the material of the hub substantially fills both of the annular grooves.

9. The coupled shaft and hub of claim 8, wherein the pair of annular grooves are separated by a cylindrical part of the shaft.

10. The coupled shaft and hub of claim 5, wherein coupling forces between the hub and the shaft include shearing and compression forces.

11. The coupled shaft and hub of claim 5, wherein an inner diameter of the coupling hole is smaller than an outer diameter of the outer periphery of the part of the shaft.

12. A coupling method, for a shaft and a hub of a disk device in which a hub having one or more attached disks and a shaft are integrally rotated, comprising:
   press-fitting a part of the shaft, having a plurality of annular grooves formed in an outer periphery of the part of the shaft and being provided with a crest of a cylindrical part between the grooves, into a coupling hole in a central portion of the hub;
   plastic-deforming a region of the hub adjacent to the coupling hole over the outer periphery of the part of the shaft; and
   causing material for the hub to plastic-flow into and substantially fill the annular grooves by said plastic-deformation and to apply compression to the shaft;
   whereby a coupling force comprises shearing force and compressing force.

13. The coupling method for a shaft and a hub of a disk device according to claim 12, wherein before the press-fitting step, the method further comprises forming the coupling hole and the part of the shaft such that an inner diameter of the coupling hole is smaller than an outer diameter of the outer periphery of the part of the shaft.

* * * * *